United States Patent
Miyasaka et al.

(10) Patent No.: US 7,081,765 B2
(45) Date of Patent: Jul. 25, 2006

(54) ELECTROSTATIC CAPACITANCE DETECTION DEVICE

(75) Inventors: Mitsutoshi Miyasaka, Suwa (JP); Hiroyuki Hara, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/925,031

(22) Filed: Aug. 25, 2004

(65) Prior Publication Data

US 2005/0078856 A1   Apr. 14, 2005

(30) Foreign Application Priority Data

Aug. 29, 2003   (JP) .............................. 2003-209666

(51) Int. Cl.
*G01R 27/26* (2006.01)
(52) U.S. Cl. ..................... 324/671; 324/663
(58) Field of Classification Search ............... 324/671, 324/663; 382/124
See application file for complete search history.

(56) References Cited

U.S. PATENT DOCUMENTS

| | | | |
|---|---|---|---|
| 5,179,345 A * | 1/1993 | Jenkins et al. | 324/678 |
| 6,411,727 B1 * | 6/2002 | Harkin | 382/124 |
| 6,448,790 B1 * | 9/2002 | Imai | 324/661 |
| 6,483,931 B1 * | 11/2002 | Kalnitsky et al. | 382/124 |
| 6,657,269 B1 * | 12/2003 | Migliorato et al. | 257/414 |
| 2005/0031175 A1 * | 2/2005 | Hara et al. | 382/124 |

FOREIGN PATENT DOCUMENTS

| | | |
|---|---|---|
| JP | A 11-118415 | 4/1999 |
| JP | A 11-312811 | 11/1999 |
| JP | A 2000-279397 | 10/2000 |
| JP | A 2000-346608 | 12/2000 |
| JP | A 2001-56204 | 2/2001 |
| JP | A 2001-133213 | 5/2001 |
| JP | A 2003-4697 | 1/2003 |
| JP | A 2003-172602 | 6/2003 |
| JP | A 2003-254706 | 9/2003 |

OTHER PUBLICATIONS

U.S. Appl. No. 10/808,523, filed Mar. 25, 2004, Hara et al.

* cited by examiner

*Primary Examiner*—Anjan Deb
(74) *Attorney, Agent, or Firm*—Oliff & Berridge, PLC

(57) ABSTRACT

Aspects of the invention provide a superior electrostatic capacitance detecting device. The electrostatic capacitance detection device can include M number of row lines, N number of column lines, and electrostatic capacitance detecting devices formed at intersections of these lines. The electrostatic capacitance detecting element can include a signal detection element, a signal amplifying element, a column selecting element, and a row selecting element, and the signal detection element can include a capacitance detecting electrode, a capacitance detecting dielectric layer, and a reference capacitor, and one electrode of the reference capacitor connects to a column line.

21 Claims, 5 Drawing Sheets

$$V_{GT} = \frac{kC_T + C_R}{C_D + C_T + C_R} \cdot V_{dd}$$

Since $0 < k \leq 1$, $kC_T + C_R \leq C_T + C_R$

If $C_D \gg C_T + C_R$ ... Condition 1, $C_D \gg kC_T + C_R$,

Then $V_{GT} \approx 0$

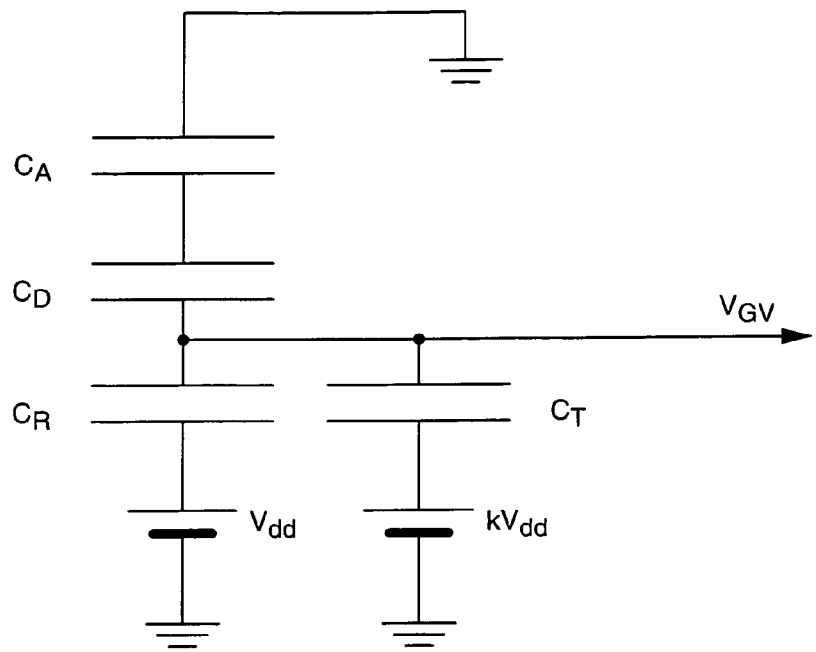

$$V_{GV} = \frac{kC_T + C_R}{\dfrac{C_A C_D}{C_A + C_D} + C_T + C_R} \cdot V_{dd}$$

$$= \frac{V_{dd}}{\dfrac{C_T + C_R}{kC_T + C_R} + \dfrac{1}{(kC_T + C_R)/C_D + (kC_T + C_R)/C_A}}$$

Because of the Condition 1

$$C_D \gg C_T + C_R \geq kC_T + C_R$$

$$V_{GV} \approx \frac{V_{dd}}{\dfrac{C_T + C_R}{kC_T + C_R} + \dfrac{C_A}{kC_T + C_R}}$$

If $C_R \gg C_A$, ... Condition 2 then $C_R + kC_T \gg C_A$ $$\therefore V_{GV} \approx \frac{kC_T + C_R}{C_T + C_R} \cdot V_{dd}$$

If $C_R \gg C_T$, ... Condition 3 then $V_{GV} \approx V_{dd}$

FIG. 5

ELECTROSTATIC CAPACITANCE DETECTION DEVICE

BACKGROUND OF THE INVENTION

1. Field of Invention

This invention relates to an electrostatic capacitance detection device capable of reading surface contours of a target object having minute ridges and valleys of a surface such as a fingerprint through detection of electrostatic capacitance which changes according to a distance from the surface of the object.

2. Description of Related Art

Related electrostatic capacitance detection devices used for fingerprint sensors and the like can be formed on a single crystal silicon wafer deposited with a sensor electrode and a dielectric layer set up on the sensor electrode Japanese Unexamined Patent Publication No. 11-118415, No. 2000-346608, No. 2001-56204, No. 2001-133213 and the like. FIG. 1 shows the principle of operation of a related electrostatic capacitance detection device. The sensor electrode and the dielectric layer form one of a pair of electrodes in a capacitor and the dielectric layer, and a human becomes the other electrode grounded. The electrostatic capacitance $C_F$ of this capacitor changes according to the ridges and valleys in a fingerprint contacting the surface of the dielectric layer. On the other hand, on the semiconductor substrate, there is prepared a capacitor forming the electrostatic capacitance $C_S$, and these two capacitors are connected in series upon which a predetermined voltage is impressed. In this manner, there is generated a charge Q between the two capacitors, corresponding to the ridges and valleys in a fingerprint. This charge Q is detected using typical semiconductor technology and the surface contours of the target object are read.

However, these related electrostatic capacitance detection devices are formed on a single crystal silicon wafer, so that when too much finger pressure is applied at the time of using them as a fingerprint sensor, there was a breaking problem.

In addition, a size of approximately 20 mm×20 mm is required of a fingerprint sensor because of this application, hence, the sensor electrodes occupy a greater part of an area of the electrostatic capacitance detection device. The sensor electrodes are naturally formed on a single-crystal silicon wafer, while the major part of the single-crystal silicon wafer (the lower sensor electrode) created by expending enormous energy and labor serves a mere role of nothing but a supporting member. Namely, the related electrostatic capacitance detection devices are not only expensive, but also formed through huge waste and cost.

Further, it has strongly been suggested in recent years to attach a function of personal identification to cards such as credit cards and cash dispensing cards so as to enhance card security, whereas the related electrostatic capacitance detection devices made on a single-crystal silicon wafer lack flexibility, thus making it impossible to be formed on a plastic substrate.

SUMMARY OF THE INVENTION

In view of the above-mentioned circumstances, aspects of the invention can provide a superior electrostatic capacitance detection device which excels in stable operation, reduction of the expenditure of unnecessary energy and labor during manufacture, and a capacity to be fabricated on a substrate other than a single-crystal silicon wafer.

An electrostatic capacitance detection device of the invention can read surface contours of a target object by detecting electrostatic capacitance, which changes according to a distance from a target object, comprises: a plurality of output lines and a plurality of power-supply lines, M number of row lines and N number of column lines arrayed in a matrix of M rows and N columns, and M×N number of electrostatic capacitance detecting elements formed at an intersection of each row line and each column line. Each electrostatic capacitance detecting element can include a signal detection element, a signal amplifying element, a column selecting element, and a row selecting element. The signal detection element includes a capacity detecting electrode, a capacity detecting dielectric layer, and a reference capacitor, whereas the reference capacitor consists essentially of a reference capacitor first electrode, a reference capacitor dielectric layer, and a reference capacitor second electrode. The signal amplifying element, the column selecting element, and the row selecting element are mutually connected in series, and these three elements are arranged between the output line and the power-supply line. The invention can include the reference capacitor first electrode and the column line which are electrically connected. Also, the capacitance detection electrode is electrically connected to the reference capacitor second electrode.

On the other hand, the signal amplifying element is constituted by an MIS thin-film semiconductor device for signal amplification consisting of a gate electrode, a gate insulator, and a semiconductor layer, whereas the gate electrode of the signal amplifying element is electrically connected to the capacitance detecting electrode and the reference capacitor second electrode. The column selecting element can be constituted by an MIS thin-film semiconductor device for column selection consisting of a gate electrode, a gate insulator, and a semiconductor layer, and the present invention also comprises the gate electrode of the MIS thin-film semiconductor device for column selection which is electrically connected to the column line. The row selecting element is constituted by an MIS thin-film semiconductor device for row selection consisting of a gate electrode, a gate insulator, and a semiconductor layer, whereas the gate electrode of the row selecting element is electrically connected to the row line. The invention further comprises the MIS thin-film semiconductor device for signal amplification and the MIS thin-film semiconductor device for column selection present in the electrostatic capacitance detecting element which are the thin-film conductor devices of the same conductive type.

The power-supply line and the output line are set up suitably in a matrix of M rows and N columns, and the power-supply line is connected to a negative power supply. or a positive power supply at all times. On the other hand, an instrument consisting of an ammeter or a voltmeter is connected to outside the matrix of M rows and N columns preceding the output line. When the power-supply line is connected to the negative power supply at all times, the output source is connected to the positive power supply through the instrument. Conversely, when the power-supply line is connected to the positive power supply at all times, the output line is connected to the negative power supply through the instrument. In this invention, if a thin-film semiconductor device in the electrostatic capacitance detecting element is an n type, the negative power supply can mean ground potential (0 volt), while the positive power supply can mean a plus potential (for example, +2.5V or +3.3 V).

On the other hand, when a thin-film semiconductor device in the electrostatic capacitance detecting element is a p type, the positive power supply can mean ground potential (0 volt), while the negative power-supply can mean a minus potential (for example, −2.5V or −3.3 V). In this invention, if the column selecting element is an n-type thin-film semiconductor device, the row line is maintained at a negative power-supply potential (ground potential) at the time of non-selection, and a positive power-supply potential (plus potential) is given at the time of selection. Also, in this invention, if the row selecting element is an n-type thin-film semiconductor device, the row line is maintained at a negative power-supply potential (ground potential) at the time of non-selection, and a positive power-supply potential (plus potential) is given at the time of selection. In this invention, if the column selecting element is a p-type thin-film semiconductor device, the column line is maintained at a positive power-supply potential (ground potential) at the time of non-selection, and a negative power-supply potential (minus potential) is given at the time of selection. Also, in this invention, if the row selecting element is a p-type thin-film semiconductor device, the row line is maintained at a positive power-supply potential (ground potential) at the time of non-selection, and a minus power-supply potential (minus potential) is given at the time of selection.

The invention can include the dielectric layer of the reference capacitor and the gate insulator of the MIS thin-film semiconductor device which are formed of the same material. These films may not be formed on the same layer. The reference capacitor first electrode may be formed of the same material as the drain region of the MIS thin-film semiconductor device for signal amplification. Further, the reference capacitor first electrode and the drain region of the MIS thin-film semiconductor device for signal amplification are formed on the same layer.

The invention can include an element capacitance $C_D$, which is sufficiently larger than $C_R+C_T$, a sum of the reference capacitor capacitance $C_R$ and the transistor capacitance $C_T$, if the reference capacitor capacitance $C_R$ and the transistor capacitance $C_T$ of the MIS thin-film semiconductor device for signal amplification are respectively defined by the equations ($\in_0$ is the permitivity in vacuum)

$$C_R = \in_0 \cdot \in_R \cdot S_R / t_R$$

$$C_T = \in_0 \cdot \in_{ox} \cdot S_T / t_{ox}$$

where $S_R$ (μm²) is the area of the reference capacitor electrode, $t_R$ (μm) is the thickness of the reference capacitor dielectric layer, $\in_R$ is the dielectric constant of the reference capacitor detecting dielectric layer, $S_T$ (μm²) is the area of gate electrode of the MIS thin-film semiconductor device for signal amplification, $t_{ox}$ is the thickness of the gate insulator, and $\in_{ox}$ is the dielectric constant of the capacitance detecting dielectric layer, and the element capacitance $C_D$ is sufficiently larger than $C_R+C_T$, a sum of the reference capacitor capacitance $C_R$ and the transistor capacitance $C_T$, if the element capacitance $C_D$ of the signal detection element is defined by the equation ($\in_0$ is the permitivity in vacuum)

$$C_D = \in_0 \cdot \in_D \cdot S_D / t_D$$

where the area of the capacitance detecting electrode is $S_D$ (μm²), $t_D$ (μm) is the thickness of the capacitance detecting dielectric layer, and $\in_D$ is the dielectric constant of the capacitance detecting dielectric layer. Further, it is ideal for the reference capacitor capacitance $C_R$ to be sufficiently larger than the transistor capacitance $C_T$. Consequently, the element capacitance $C_D$ is also sufficiently larger than the reference capacitor capacitance $C_R$ itself. The capacitance detecting dielectric layer further comprises being located on the uppermost surface of the electrostatic capacitance detecting device. Furthermore, according to the invention, the reference capacitor capacitance $C_R$ is sufficiently larger than the transistor capacitance $C_T$, if the target object is not in contact with and is separated from the capacitance detecting dielectric layer by the target object distance $t_A$, and if the target object $C_A$ is defined by the equation:

$$C_A = \in_0 \cdot \in_A \cdot S_D / t_A$$

where $\in_0$ is the permitivity in vacuum, $\in_A$ is the dielectric constant of air, and $S_D$ is the area of the capacitance detecting electrode. It is also ideal for the reference capacitor capacitance $C_R$ to be sufficiently larger than the transistor capacitance $C_T$.

According to the invention, the element capacitance $C_D$ can be sufficiently larger than $C_R+C_T$, which is a sum of the reference capacitor capacitance $C_R$ and the transistor capacitance $C_T$, if the capacitance detecting dielectric layer is located on the uppermost surface of the electrostatic capacitance detection device, and if the reference capacitor capacitance $C_R$ and the transistor capacitance $C_T$ of the MIS thin-film semiconductor device for signal amplification are respectively defined by the equations ($\in_0$ is the permitivity in vacuum):

$$C_R = \in_0 \cdot \in_R \cdot S_R / t_R$$

$$C_T = \in_0 \cdot \in_{ox} \cdot S_T / t_{ox}$$

where SR (μm²) is the area of the reference capacitor electrode, $t_R$ (μm) is the thickness of the reference capacitor dielectric layer, $\in_R$ is the dielectric constant of the reference capacitor detecting dielectric layer, $S_T$ (μm²) is the area of the gate electrode of the MIS thin-film semiconductor device for signal amplification, $t_{ox}$ is the thickness of the gate insulator, and $\in_{ox}$ is the dielectric constant of the capacitance detecting dielectric layer, and if the element capacitance $C_D$ of the signal detection element is defined by the equation ($\in_0$ is the permitivity in vacuum):

$$C_D = \in_0 \cdot \in_D \cdot S_D / t_D$$

where the area of the capacitance detecting electrode is $S_D$ (μm²), $t_D$ is the thickness of the capacitance detecting dielectric layer, and $\in_D$ is the dielectric constant of the capacitance detecting dielectric layer; and the element capacitance $C_D$ is sufficiently larger than $C_R+C_T$, a sum of the reference capacitor capacitance $C_R$ and the transistor capacitance $C_T$, if the target object is not in contact with and is separated from the capacitance detecting dielectric layer by the target object distance $t_A$, and if the target object $C_A$ is defined by the equation:

$$C_A = \in_0 \cdot \in_A \cdot S_D / t_A$$

where $\in_0$ is the permitivity in vacuum, $\in_A$ is the dielectric constant of air, and $S_D$ is the area of the capacitance detecting electrode. It is also ideal for the reference capacitor capacitance $C_R$ to be sufficiently larger than the transistor capacitance $C_T$ itself, and the reference capacitor capacitance $C_R$ itself is sufficiently larger than the target object $C_A$.

BRIEF DESCRIPTION OF THE DRAWINGS

The invention will be described with reference to the accompanying drawings, wherein like numerals reference like elements, and wherein:

FIG. 5 is a diagram illustrating the principle of the invention; and

DETAILED DESCRIPTION OF PREFERRED EMBODIMENTS

The invention is to fabricate an electrostatic capacitance detection device that reads the surface contours of a target object by detecting electrostatic capacitance, which changes according to the distance from a target object, by an MIS thin-film semiconductor device composed of a metal-insulator-semiconductor layer. Since the thin-film semiconductor device is typically fabricated on a glass substrate, it is generally known as technology of fabricating, at low cost, a semiconductor integrated circuit that requires a large area. Specifically, it has recently been applied to a device such as a liquid crystal display. Therefore, fabricating a thin-film semiconductor device for use as an electrostatic capacitance detection device in a fingerprint sensor obviates any need to use an expensive substrate such as a single-crystal silicon wafer produced with enormous energy. The device may be fabricated at low cost on glass without wasting precious global resources. In addition, a semiconductor integrated circuit made up of a thin-film semiconductor device may be fabricated on a plastic substrate by applying a transfer technology commonly called SUFTLA (Japanese Unexamined Patent Publication No. Hei 11-312811 and by S. Utsunomiya et. al in *Society for Information Display*, p. 916 (2000). Accordingly, such electrostatic capacitance detection device may be freed from a single-crystal silicon wafer to be made on a plastic substrate.

Figure 1:
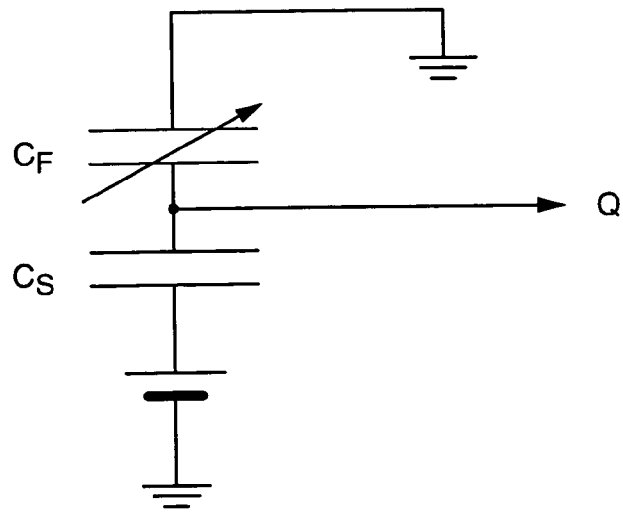
FIG. 1 is a diagram illustrating the principle of operation in the related technology.

Now, as shown in FIG. 1, using a thin-film semiconductor device to produce an electrostatic capacitance detection device according to the conventional principles of operation is impossible with the current thin-film semiconductor device technology. Since a charge Q induced between two capacitors connected in series is extremely small, the charge Q may be read if single-crystal silicon LSI technology that makes high-accuracy detecting possible is used. However, the charge Q cannot be accurately read with a thin-film semiconductor device. This is because the transistor characteristics in a thin-film semiconductor are not as good as the transistor characteristics obtained with single-crystal silicon LSI technology, and, moreover, because of a large degree of deviation in characteristics between thin-film semiconductor devices. Hence, the electrostatic capacitance detection device of the present invention has a plurality of output lines and a plurality of power-supply lines, and M number (M is an integer of 1 or more) of row lines and N number (N is an integer of 1 or more) of column lines arranged in a matrix of M rows and N columns as well as M×N number of electrostatic capacitance detecting elements provided at an intersection of each row line and each column line, with a configuration such that each of these electrostatic capacitance detecting elements includes a signal detection element, a signal amplifying element, a column selecting element, and a row selecting element.

The signal detection element can include a capacitance detecting electrode, a capacitance detecting dielectric layer, and a reference capacitor, while, further, the reference capacitor consists of a reference capacitor first electrode, a reference capacitor dielectric layer, and a reference capacitor second electrode. When a target object, such as a fingerprint, contacts or approaches a capacitance detecting dielectric layer, a potential $V_G$ generates in the capacitance detecting dielectric layer corresponding to an electrostatic capacitance with the target object.

In the invention, this potential $V_G$ is amplified by a signal amplifying element provided in each capacitance detecting dielectric layer and converted to an amplified current or voltage. Specifically, the signal amplifying element consists of an MIS thin-film semiconductor device for signal amplification composed of a gate electrode, a gate insulator, and a semiconductor layer. One electrode of the reference capacitor is connected to a column line, while the other electrode is connected to the capacitance detecting electrode and the gate electrode of the MIS thin-film semiconductor device for signal amplification. For example, if the reference capacitor first electrode and the column line are electrically connected, the reference capacitor second electrode and the capacitance detecting electrode are electrically connected, and further the capacitance detecting electrode and the reference capacitor second electrode are electrically connected to the gate electrode of the MIS thin-film semiconductor device for signal amplification. On the other hand, if the reference capacitor second electrode and the column line are electrically connected, the reference capacitor first electrode and the capacitance detecting electrode are electrically connected, and further the capacitance detecting electrode and the reference capacitor first electrode are electrically connected to the gate electrode of the MIS thin-film semiconductor device for signal amplification.

Figure 2:
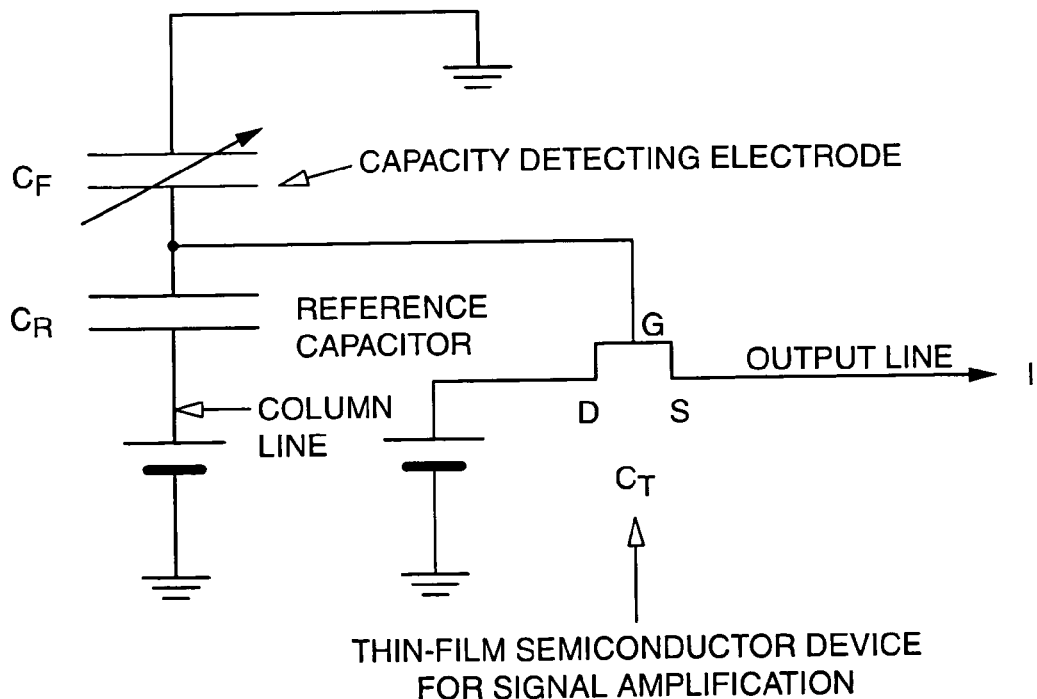
FIG. 2 is a diagram illustrating the principle of operation in the invention.

The operating principles of the invention having such a configuration will be described referring to FIG. 2. A potential $V_G$ induced between a capacitor having an electrostatic capacitance $C_F$, which changes according to the surface contours of a target object, and a synthetic capacitance $C_R + C_T$ between a capacitor having an electrostatic capacitance $C_F$ and the MIS thin-film semiconductor device for signal amplification having a transistor capacitance $C_F$ is connected to the gate electrode (G in the figure) of the MIS thin film semiconductor device, and changes the gate potential of the semiconductor device. Thus, if a predetermined voltage is impressed on the drain region (D in the figure) of this thin-film semiconductor device, the current I flowing between the source and the drain of the thin-film semiconductor device in proportion to the induced potential $V_G$ is significantly modulated. An induced charge Q in proportion to the induced potential $V_G$ generates in the gate electrode and the like, but the charge does not flow elsewhere but is retained therein, thereby making a source and drain current $I_{ds}$ constant. Hence, the measurement of the current $I_{ds}$ is also facilitated by raising the drain voltage or by extending the length of measuring time and the like. Consequently, the surface contours of a target object may be measured with sufficient accuracy even if a thin-film semiconductor device is used. A signal that amplified electrostatic capacitance information of the target object (a source and drain current and a voltage in response thereto) is read by the instrument through the output line. The electrostatic capacitance of the target object may be measured by way of measuring the source and drain current $I_{ds}$ or measuring a voltage $V_{ds}$ through the signal amplifying element in response to such source and drain current $I_{ds}$.

Next, a circuit configuration of an exemplary electrostatic capacity detecting element that embodies the invention will be described with reference to FIG. 3. As mentioned above, each electrostatic capacity detecting element consists of a signal amplifying element and a signal detection element as indispensable constituent elements. The signal detection element includes a capacity detecting electrode, a capacity detecting dielectric layer, and a reference capacitor. The reference capacitor consists essentially of a reference capacitor first electrode, a reference capacitor dielectric layer, and a reference capacitor second electrode. The signal amplifying element is constituted by an MIS thin-film semiconductor device for signal amplification consisting of a gate electrode, a gate insulator, and a semiconductor layer. In addition, to prevent information interference between electrostatic capacity detecting elements and to detect the surface contours of a target object at high speed in high precision, in this application, each electrostatic capacity detecting element has a column selecting element and a row selecting element. The column selecting element is constituted by an MIS thin-film semiconductor device for column selection consisting of a gate electrode, a gate insulator, and a semiconductor layer. Likewise, the row selecting element is constituted by an MIS thin-film semiconductor device for row selection consisting of a gate electrode, a gate insulator, and a semiconductor layer. Three kinds of thin-film semiconductor device making up the signal amplifying element, the column selecting element, and the row selecting element are of the same conductive type. Further, the signal amplifying element, the column selecting element, and the row selecting element are connected in series and set up between the power-supply line and the output line.

As an example, the drain electrode of the MIS thin-film semiconductor device for row selection is electrically connected to the output line, the source electrode of the MIS thin-film semiconductor device for row selection and the drain electrode of the MIS thin-film semiconductor device for column selection are connected, the source electrode of the MIS thin-film semiconductor device for column selection and the drain electrode of the MIS thin-film semiconductor device for signal amplification are further connected, and the source electrode of the MIS thin-film semiconductor device for signal amplification is electrically connected to the power-supply line. Electrical connection can mean the state of electrical continuity through a switching element and the like, Naturally, the source electrode of the MIS thin-film semiconductor device for signal amplification may be directly connected to the power-supply line, and the drain electrode of the MIS thin-film semiconductor device for row selection may be directly connected to the output line. Also, since the source electrode and the drain electrode of a transistor are structurally symmetrical, the source electrode may be replaced with the drain electrode. (Namely, in the above-mentioned example, the source electrode and the drain electrode may be replaced with each other.) However, strictly speaking in physical terms, in a n-type transistor, that which is at a lower potential is defined as a source electrode, and in a p-type transistor, that which is at a higher potential is defined as a source electrode.

In this example, a high potential ($V_{DD}$) is provided to the output line through an instrument, the power-supply line is connected to a negative power supply, and an n-type transistor is used, under these conditions, for the signal amplifying element, the column selecting element, and the row selecting element. Consequently, the drain electrodes of the signal amplifying element, the column selecting element, and the row selecting element are located on the output line side, and the source electrodes are located on the power-supply line side. Further, positional relationships among the column selecting element, the signal amplifying element, and the row selecting element may be replaced with one another. For example, the signal amplifying element may be located on the first output line side, and the row selecting element may be located on the first power-supply line side.

In the invention, the reference capacitor first electrode can be electrically connected to the column line, while the other electrode (the second electrode) is connected to the capacitance detecting electrode and the gate electrode of the MIS semiconductor device for signal amplification. In the invention, since a high potential (plus potential when the column selecting element and the signal amplifying element are an n-type semiconductor device, and minus potential when the column selecting element and the signal amplifying element are a p-type semiconductor device) is given in the state where the column line is selected, a high potential is impressed with absolute certainty on the other electrode of the reference capacitor directly connected to the column selecting element and a potential corresponding to the electrostatic capacitance of a target object is impressed on the gate electrode of the signal amplifying element. In this manner, electrical conductivity between a source and a drain of the MIS thin-film semiconductor device for signal amplification makes a change, which is detected, so that, for example, ridge and valley information of a target object, such as fingerprint information, is acquired.

The column selecting element and the row selecting element are installed for the purpose of preventing information interference between the electrostatic capacitance detecting elements. The column selecting element is constituted by an MIS thin-film semiconductor device for column selection including a gate electrode, a gate insulator, and a semiconductor layer, and the gate electrode of the MIS thin-film semiconductor device for column selection is electrically connected to the column line. The row selecting element can include an MIS thin-film semiconductor device for row selection consisting of a gate electrode, a gate insulator, and a semiconductor layer, and the gate electrode of the row selecting element is electrically connected to the row line. The row selecting element is considered in the ON state with the row selecting signal added to the row line, and the column selecting element is considered in the ON state with the column selecting signal added to the column line.

Figure 3:
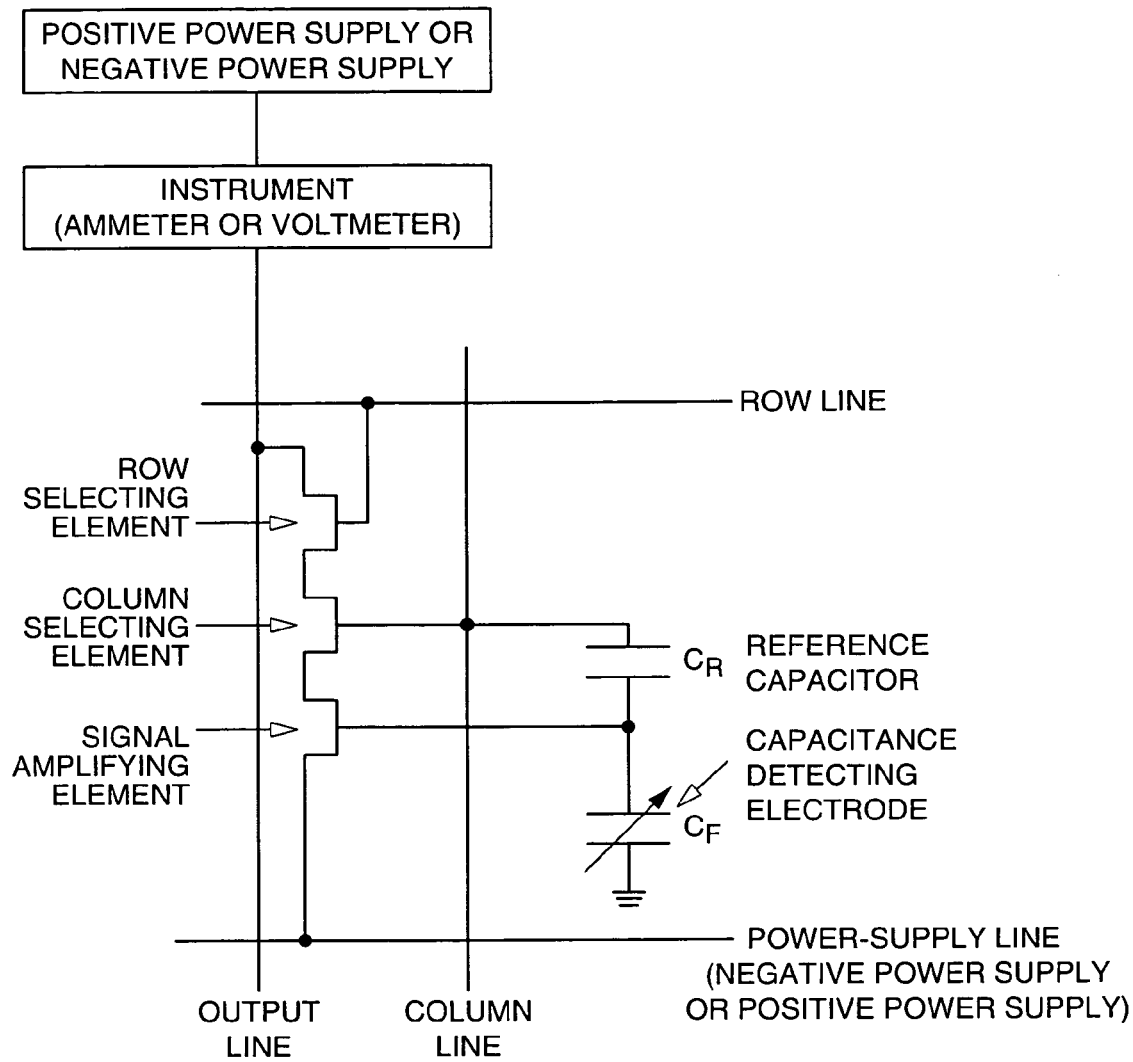
FIG. 3 is a diagram illustrating circuit configuration of an electrostatic capacitance detecting element in the invention.

In FIG. 3, an n-type semiconductor device is used for the row selecting element, the gate electrode of this n-type semiconductor device is connected to the row line, and the drain electrode is connected to the output line. In this manner, the electric conductivity of the row selecting element rises only when a high potential selecting signal ($V_{dd}$: positive power-supply potential) is inputted to the row line, and it enters the SWITCH ON state. The source electrode of the n-type thin-film semiconductor device for row selection is connected to the drain electrode of the n-type thin-film semiconductor device for column selection, and the gate electrode of the n-type thin-film semiconductor device for column selection is connected to the column line. The column line is at a low potential ($V_{SS}$: negative power-supply potential) when it is in the state of non-selection, and a high potential ($V_{dd}$: positive power-supply potential) is provided when it is in the state of selection. Consequently, only when the column line is selected, the electric conductivity of the column selecting element rises, and the SWITCH ON state comes on. Ultimately, a specific row line (for example, i-th row line) is selected from M row lines, and a high potential is impressed on that row line (i-th row line).

This causes the row selecting element connected to the selected row line (i-th row line) to be in the ON state.

Next, under this condition, when a selecting signal specific column line (for example, j-th column line) of N column lines, the electric conductivity of the column selecting element connected to that column line (i-th column line) rises and the TRANSISTOR ON state comes on. Consequently, only the electrostatic capacitance detecting element (the electrostatic capacitance detecting element located at the i-th row and the j-th column) located at an intersection of the selected row (i-th row) and the selected column (i-th column) is selected from a group of M×N pieces of electrostatic capacitance detecting elements to change the electric conductivity between the output line and the power-supply line. Namely, only the signal amplifying element located at the i-th row and j-th column carries the role of electric conductivity between the output line and the power-supply line, so that the ridge and valley information of the target object may be acquired by measuring a source and drain current $I_{ds}$ of the signal amplifying element located at the i-th row and j-th column and a corresponding voltage thereof by means of an instrument connected to the output line. In other words, column selection is uniquely performed by setting up a column selecting element in each electrostatic capacitance detecting element, thereby preventing information interference among the columns.

Likewise, row selection can be uniquely performed by setting up a row selecting element in each electrostatic capacitance detecting element, thereby preventing information interference among the rows. Information interference from the output line to the power-supply line may be prevented by setting up the column selecting element and the row selecting element in series, and electrostatic capacitance may be detected in good accuracy. To realize these effects, it is only necessary for the column selecting element, the row selecting element, and the signal amplifying element to be arranged in series, and their sequence is not subject to any rule. What is required is that these three elements are arranged in series between the power-supply line and the output line, the gate electrode of the row selecting element is connected to the row line, the gate electrode of the column selecting element is connected to the column line, and the gate electrode of the signal amplifying element is connected to the capacitance detecting electrode.

In this manner, in the invention, when the electrostatic capacitance detecting element is put in the state of selection by means of the row selecting element and the column selecting signal, the drain electrode of the MIS thin-film semiconductor device for signal amplification is electrically in continuity with the output line and, and the source electrode is electrically made in continuity with the power-supply line. Actually, according to an array sequence, there may be installed switching elements such as a row selecting element and a column selecting element between the signal amplifying element and the output line and between the signal amplifying element and the power-supply line. Nevertheless, because of high electric conductivity of these switching elements when in the state of selection, the drain electrode of the signal amplifying element is connected to the output line, so that the source electrode is connected to the power-supply line. As a result, the electric conductivity of the signal amplifying element itself determines a current value from the output line to the power-supply line.

As described below, if a convexity of the target object (for example, a ridge of a fingerprint) is in contact with the capacitance detecting dielectric layer, the electric conductivity of the signal amplifying element is small, so that hardly any current is supplied from the output line to the power-supply line. Conversely, if a concavity of the target object (for example, a valley of a fingerprint) comes to the surface of the capacitance detecting dielectric layer and a thin air film generates between the dielectric layer and the target object, the electric conductivity of the signal amplifying element becomes significantly large, so that a large current is supplied from the output line to the power-supply line. In this manner, a current appearing on the output line (or a voltage corresponding thereto) is measured and information on the ridges and valleys of the surface of the target object is acquired.

If each capacitance detecting dielectric layer includes a row selecting element and a column selecting element, as mentioned above, there is noted an advantage of selecting with absolute certainty only a specific capacitance detecting dielectric layer from a group of M×N capacitance detecting dielectric layers. On the other hand, if there is no reference capacitor, transistor capacitance of the signal amplifying element and capacitance of the target object are capacitance-coupled, a product of a capacitance ratio thereof multiplied by the drain voltage of the signal amplifying element is impressed on the gate electrode of the signal amplifying element. However, since the row selecting element, the column selecting element, and the signal amplifying element are connected in series, the drain potential of the signal amplifying element diminishes by a portion of the row selecting element and the column selecting element more than the high potential ($V_{DD}$) impressed on the output line to the power-supply line.

For example, assuming the same level of electric conductivity in the ON state of the row selecting element, the column selecting element, and the signal amplifying element, if $V_{DD}$ is impressed on the output line with the power-supply line being at the ground potential, the drain potential of the signal amplifying element drops to about $V_{DD}/3$, which is about one-third of $V_{DD}$. Consequently, even if the electrostatic capacitance of the target object changes, the amount of change of the gate potential of the signal amplifying element diminishes to about $V_{DD}/3$ at maximum, so that detecting accuracy lowers or $V_{DD}$ must be increased.

To solve such problems, in the present invention, a reference capacitor is provided, with one electrode thereof being directly connected to the column line. This enables a high potential ($V_{DD}$) to be impressed with absolute certainty on one electrode of the reference capacitor, even if there are a row selecting element and a column selecting element, hence, the gate electrode of the signal amplifying element may be near zero at minimum and near $V_{DD}$ at maximum. Namely, even if a configuration of the invention is such that the row selecting element, the column selecting element, and the signal amplifying element are connected in series and provided between the output line and the power-supply line, the gate potential of the signal amplifying element may be variable from the vicinity of a negative power-supply potential ($V_{SS}$: zeo volt) to the vicinity of a positive power-supply potential according to the electrostatic capacitance of the target object to be measured.

If the gate potential of the signal amplifying element is near a negative power-supply potential, the MIS thin-film semiconductor device for signal amplification is in the OFF state, thereby significantly diminishing the electric conductivity of the signal amplifying element. Conversely, if the gate potential of the signal amplifying element is near a positive power-supply potential, the MIS thin-film semiconductor device for signal amplification is in the ON state, thereby significantly raising the electric conductivity of the signal amplifying element. Measuring such changes of the electric conductivity makes it possible to collect information on ridges and valleys on the surface of the target object.

In the above-mentioned configuration, it is necessary for the column selecting element and the signal amplifying element to be the thin-film semiconductor devices of the same conductive type, because a column selecting signal given to the column line is impressed on the gate electrode of the column selecting element, while, at the same time, the column selecting signal is impressed on the gate electrode of the signal amplifying element through the reference capacitor. Specifically, in a case where the column selecting element and the signal amplifying element are n-type semiconductor devices, a negative power-supply potential (ground potential, zero volt) is given with the column line in the state of non-selection, and a positive power-supply potential (high potential, plus potential, for example. +2.5V or +3.3V) is given in the state of selection.

In a case where the column selecting element and the signal amplifying element are p-type semiconductor devices, a positive power-supply potential (ground potential, zero volt) is given with the column line in the state of non-selection, and a negative power-supply potential (high potential, plus potential, for example. −2.5V or −3.3V) is given in the state of selection. Further, if a semiconductor device is used for the row selecting element, it is preferable that the MIS thin-film semiconductor device for row selection be the same conductive type as the column selecting element and the signal amplifying element. In this manner, the source and drain regions of the three kinds of thin-film semiconductor device all become the same conductive type, thus making it possible to obviate an unnecessary contact hole and the like and to reduce the size of an element. As a result, an area of the capacitance detecting electrode may be made larger to raise the detecting sensitivity.

For example, the row selecting element, the column selecting element, and the signal amplifying element are all n-type semiconductor devices, the row line and the column line are maintained at a negative power-supply potential (ground potential) at the time of non-selection, and a positive power-supply potential (plus potential) is given to respective lines at the time of selection. Or the row selecting element, the column selecting element, and the signal amplifying element are all p-type semiconductor devices, the row line and the column line are maintained at a positive power-supply potential (ground potential) at the time of non-selection, and a negative power-supply potential (minus potential) is given to respective lines at the time of selection.

The power-supply line and the output line are set up in a matrix of M rows and N columns, as the occasion may demand. The output line and the column line set up in the electrostatic capacitance detecting device, as the occasion may demand, are the same number of N lines and may be taken out in the column direction. They may also be the same M lines as the row lines to be taken out in the row direction. Further, 1 output line per 2 columns (N/2 lines) may be set up or 1 output line per 2 rows (M/2 lines) may be set up. Likewise, it is possible for the power-supply lines to be provided, as the occasion may demand, in the electrostatic capacitance detecting device to be the same number N lines as the column lines and to be taken out in the column direction or to be the same number M lines as the row lines to be taken out in the row direction. Furthermore, 1 power-supply line per 2 columns (N/2 lines) may be set up or 1 power-supply line per 2 rows (M/2 lines) may be set up. In the invention, each electrostatic capacitance detecting element is selected one by one, so that the output line and the power-supply line may have a variety of modes. In an example of FIG. 3, the number of output lines is set as the same N lines as the column lines and taken out in the column direction, and the number of power-supply lines is set as the same M lines as the row lines and taken out in the row direction. The power-supply line is connected at all times to either of the negative power supply or the positive power supply. Preceding the output line and outside the matrix of M rows and N columns, there is connected an instrument consisting of an ammeter or a voltmeter. The instrument may be made of a thin-film semiconductor device or an external circuit using an IC may be used.

If the power-supply line is connected at all times to a negative power supply, the output line is connected to a positive power supply through an instrument. In this case, if the electric conductivity of a signal amplifying element in a selected electrostatic detecting element is large, a current from the positive power supply through the instrument flows towards the power-supply line connected to the negative power supply. If the electric conductivity in the signal amplifying element is small, this current will not generate. The instrument obtains ridge and valley information on the target object from the presence or absence of such current or corresponding potential changes.

Contrary to the preceding example, if the power-supply line is connected at all times to the positive power supply, the output line is connected to the negative power supply through an instrument. If a signal amplifying element in a selected electrostatic detecting element has a large electric conductivity, a current from the positive power supply through the instrument flows towards the power-supply line connected to the negative power supply. If the electric conductivity in the signal amplifying element is small, naturally, this current will not generate. Although the current flow is reverse to the preceding example, the ridge and valley information on the target object is obtained according to the same principle.

Now, in the above-mentioned configuration, if the MIS thin-film semiconductor device for signal amplification according to the invention is to perform its signal amplifying function effectively, a transistor capacitance $C_T$, a reference capacitor capacitance $C_R$, and an element capacitance $C_D$ of a signal detection element must be properly determined. Next, these relationships will be described referring to FIG. 4 or FIG. 5.

First, it is assumed that the ridges of an object to be measured are in contact with the capacitance detecting dielectric layer, while the target object is electrically grounded. Specifically, it is assumed that the electrostatic capacitance detecting device is used as a fingerprint sensor, and it is further assumed to detect the ridges of a fingerprint in contact with the surface of the electrostatic capacitance detection device. The reference capacitor $C_R$ and the transistor capacitance $C_T$ of the MIS thin-film semiconductor device for signal amplification are respectively defined by the equations:

$$C_R = \epsilon_0 \cdot \epsilon_R \cdot S_R / t_R$$

$$C_T = \epsilon_0 \cdot \epsilon_{ox} \cdot S_T / t_{ox}$$

where $S_R$ (μm$^2$) is the area of the gate electrode of the reference capacitor, $t_R$ (μm) is the thickness of the reference capacitor dielectric layer, $\epsilon_R$ is the dielectric constant of the reference capacitor dielectric layer, $S_T$ (μm$^2$) is the area of the gate electrode of the MIS thin-film semiconductor device for signal amplification, $t_{ox}$ (μm) is the gate insulator thickness, and $\in_{ox}$ is the dielectric constant of the gate insulator ($\in_0$ is the permittivity in vacuum). Moreover, the element capacitance $C_D$ of the signal detection element is defined by the equation:

$$C_D = \in_0 \cdot \in_D \cdot S_D / t_D$$

where $S_D$ (μm²) is the area of the capacitance detecting electrode, $t_D$ (μm) is the thickness of the capacitance detecting dielectric layer, and $\in_D$ is the dielectric constant of the capacitance detecting dielectric layer ($\in_0$ is the permittivity in vacuum). The surface of the target object serves as the ground electrode of the element capacitance $C_D$, and the capacitance detecting electrode corresponds to the other electrode with the capacitance detecting dielectric layer held in between. Since the capacitance detecting dielectric layer is connected to the gate electrode of the MIS thin-film semiconductor device for signal amplification and one electrode of the reference capacitor, a capacitor having an element capacitance of $C_D$ and a capacitor having a transistor capacitance $C_T$ are connected in series, while, at the same time, the capacitor having an element capacitance of $C_D$ is connected in series to a capacitor having a reference capacitor capacitance $C_R$. The other electrode of the reference capacitor is connected to the column line, and when the column line is selected, a voltage $V_{dd}$ is impressed.

Figure 4:
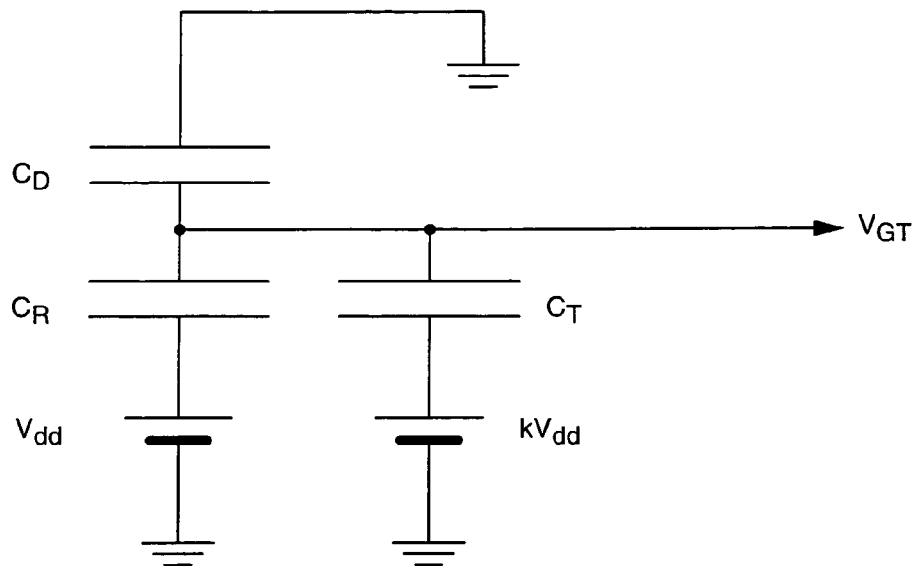
FIG. 4 is a diagram illustrating the principle of the invention.

On the other hand, since the signal amplifying element is connected in series to the column selecting element and the row selecting element and provided between the power-supply line and the output line, the drain potential of the MIS thin-film semiconductor device for signal amplification, upon selecting the electrostatic capacitance detecting element, becomes k times (0<k≦1) a potential difference $V_{dd}$ between the output line and the power-supply line. (FIG. 4). The value k is determined by resistance values of the column selecting element and the row selecting element and a resistance value of the signal amplifying element. To be specific, it is larger than zero and less than 1.

In a case where there is provided neither a column selecting element nor a row selecting element, the value k becomes 1. An impressed voltage on the column line and the drain potential of the signal amplifying element are divided according to the electrostatic capacitance of these three capacitors. Hence, in this condition, a voltage $V_{GT}$ (gate voltage when the ridges are in contact) upon the gate electrode of the MIS thin-film semiconductor device for signal amplification is given by the equation:

$$V_{GT} = \frac{kC_T + C_R}{C_D + C_T + C_R} \cdot V_{dd} \quad \text{[Equation 1]}$$

Accordingly, if the element capacitance $C_D$ is sufficiently larger than $C_R + C_T$ which is the sum of the reference capacitor capacitance $C_R$ and the transistor capacitance $C_T$, we obtain:

$$C_D >> C_T + C_R \quad \text{[Equation 2]}$$

A gate voltage $V_{GT}$ is approximated as:

$$V_{GT} \approx 0 \quad \text{[Equation 3]}$$

The gate electrode is subject to nearly no voltage. As a result, the MIS thin-film semiconductor device for signal amplification is in the OFF state, and the source and drain current I becomes extremely small. Ultimately, the signal amplifying element should release nearly no current if the ridges of a target object corresponding to the ridges of a fingerprint contact the electrostatic capacitance detection device. Hence, to ensure that, the area of gate electrode (gate length and gate width), gate insulator material, gate insulator thickness, area of reference capacitor electrode (capacitor electrode length and capacitor electrode width), reference capacitor dielectric layer material, reference capacitor dielectric layer thickness, area of capacitance detecting electrode, capacitance detecting dielectric layer material, capacitance detecting dielectric layer thickness and the like must be appropriately set so that the element capacitance $C_D$ is sufficiently larger than $C_R + C_T$ which is the sum of the reference capacitor capacitance $C_R$ and the transistor capacitance $C_T$. In general, sufficiently larger can mean a difference in magnitude of about 10 times or greater. In other words, the element capacitance $C_D$ and the transistor capacitance $C_T$ should satisfy $C_R + C_T$ which is the sum of the reference capacitor capacitance $C_R$ and the transistor capacitance $C_T$ and the following relationship:

$$C_D > 10 \times (C_R + C_T)$$

In this case, $V_{GT}/V_{dd}$ is approximately 0.1 or less, so that the thin-film semiconductor device cannot be in the ON state. For the ridges of a target object to be accurately detected, it is important that the MIS thin-film semiconductor device for signal amplification be in the OFF state when the ridges of the target object contact the electrostatic capacitance detection device. Therefore, if a positive power supply is used for the power supply voltage $V_{dd}$, there is preferably used an n-type enhancement mode transistor (normally off type), which does not release drain current at a gate voltage near zero, as the MIS thin-film semiconductor device for signal amplification. To be more ideal, there is employed an n-type MIS thin-film semiconductor device such as to meet a relationship, in which a gate voltage (minimum gate voltage) causing a drain current in transfer characteristic to become a minimum is set as $V_{min}$, which is given by:

$$0 < 0.1 \times V_{dd} < V_{min}$$

or $$0 < V_{GT} < V_{min}$$

Conversely, if a negative power supply is used for the power-supply potential, there is employed a p-type enhancement mode transistor (normally off type), which does not release drain current at a gate voltage near zero, as the MIS thin-film semiconductor device for signal amplification. To be ideal, the minimum gate voltage $V_{min}$ of the p-type MIS thin-film semiconductor device for signal amplification is given by:

$$V_{min} < 0.1 \times V_{dd} < 0$$

or $$V_{min} < V_{GT} < 0$$

By doing so, it is possible to detect accurately the ridges of the target object under a mode of a current value I being extremely small.

Next, consider circumstances where the target object is not in contact with but is separated from the capacitance detecting dielectric layer by a target object distance $t_A$. In other words, the valleys of the target object to be measured are above the capacitance detecting dielectric layer and, moreover, the target object is electrically grounded. It is presumed specifically to detect a valley in a fingerprint present over the surface of the electrostatic capacitance detection device when the electrostatic capacitance detection device is used as a fingerprint sensor. As mentioned above, in the electrostatic capacitance detection device of the present invention, it is preferable that the capacitance detecting dielectric layer is located on the uppermost surface of the electrostatic capacitance detection device. An equivalent circuit diagram in this case is shown in FIG. 5B. Since the surface of the target object is not in contact with the capacitance detecting dielectric layer, a new capacitor with air as the dielectric is formed between the capacitance detecting dielectric layer and the target object surface. This is called a target object capacitance $C_A$ and is defined as follows:

$$C_A = \epsilon_0 \cdot \epsilon_A \cdot S_D / t_A$$

where $\epsilon_0$ is the permittivity in vacuum, $\epsilon_A$ is the dielectric constant of air, and $S_D$ is the area of the capacitance detecting electrode. When such a target object is separated from the capacitance detecting dielectric layer, an element capacitance $C_D$ and a target object capacitance $C_A$ are connected in series, and further, a transistor capacitance $C_T$ and a reference capacitor capacitance $C_R$, which are mutually connected to these capacitors in parallel, are connected in series. A voltage $V_{dd}$ is impressed on the reference capacitor, and a voltage $kV_{DD}$ are impressed on a drain electrode of the signal amplifying element (FIG. 5). Since the impressed voltage is divided among the four capacitors in response to the electrostatic capacitance, a gate voltage $V_{GV}$, which is applied, under these conditions, to the gate electrode of the MIS thin-film semiconductor device for signal amplification, is given in the equation:

$$V_{GV} = \frac{kC_T + C_R}{\frac{C_A C_D}{C_A + C_D} + C_T + C_R} \cdot V_{dd} \quad \text{[Equation 4]}$$

On the other hand, in the present invention, the electrostatic capacitance detecting element is formed to meet the conditions of:

$$C_D \gg C_T + C_R \quad \text{[Equation 2]}$$

so that the drain current may become extremely small when the target object is in contact with the electrostatic capacitance detecting device. Therefore, $$V_{GV} \approx \frac{V_{dd}}{\frac{C_T + C_R}{kC_T + C_R} + \frac{C_A}{kC_T + C_R}} \quad \text{[Equation 5]}$$

$V_{GV}$ is approximated. At this point, if it is set so that the reference capacitor capacitance $C_R$ may become sufficiently larger than the target object $C_A$, $$C_R \gg C_A \quad \text{[Equation 6]}$$

The gate voltage $V_{GV}$ is further simplified as $$V_{GV} \approx \frac{kC_T + C_R}{C_T + C_R} \cdot V_{dd} \quad \text{[Equation 7]}$$

In this way, if the value k is close to 1, the gate voltage $V_{GV}$ is substantially equal to the power-supply potential $V_{DD}$. If the reference capacitor capacitance $C_R$ is set to be sufficiently larger than the transistor capacitance $C_T$, we obtain:

$$C_R \gg C_T \quad \text{[Equation 8]}$$

Regardless of the value k, the gate voltage $V_{GV}$ is expressed by the equation:

$$V_{GV} \approx V_{dd} \quad \text{[Equation 9]}$$

and the gate voltage $V_{GV}$ is nearly equal to the power-supply voltage $V_{dd}$. As a result, the MIS thin-film semiconductor device for signal amplification may be put in the ON state and an extremely large current I is obtained. In order for the signal amplifying element to conduct a large current when a valley of a target object corresponding to the valley of a fingerprint is present over the electrostatic capacitance detection device, it is necessary to configure such that the reference capacitor capacitance $C_R$ may be sufficiently larger than the target capacitance $C_A$. As mentioned above, if a difference in magnitude of about 10 times is accepted, it is generally considered to be sufficiently larger. Accordingly, it is appropriate if the reference capacitor capacitance $C_R$ and the target capacitance $C_A$ meet the relationship:

$$C_R > 10 \times C_A$$

Also, for the transistor to be in the ON state when a valley of a fingerprint and the like approach, regardless of the value k, what is required is to make the reference capacitor capacitance $C_R$ larger than the transistor capacitance $C_T$ by 10 times or more. When these conditions are met, the $V_{GT}/V_{dd}$ is approximately 0.9 or greater, and the thin-film semiconductor device easily enters the ON state. In order for a valley of a target object to be accurately detected, it is important that the MIS thin-film semiconductor device for signal amplification be in the ON state when the valley of the target object approaches the electrostatic capacitance detection device. If a positive power supply is used for the power supply voltage $V_{dd}$, an n-type enhancement mode transistor (normally off type) is used as the MIS thin-film semiconductor device for signal amplification. The threshold voltage $V_{th}$ of this transistor is preferably smaller than $V_{GV}$. It is more ideal to use an n-type MIS thin-film semiconductor device for signal amplification that satisfies the following relationship:

$$0 < V_{th} < 0.91 \times V_{dd}$$

Conversely, if a negative power supply is used for the power supply voltage $V_{dd}$, a p-type enhancement mode transistor (normally off type) is used as the MIS thin-film semiconductor device for signal amplification. Ideally, the threshold voltage $V_{th}$ of the p-type MIS thin-film semiconductor device for signal amplification is preferably larger than the $V_{GV}$. It is more ideal to use a p-type MIS thin-film semiconductor device for signal amplification that satisfies the following relationship:

$$0.91 \times V_{dd} < V_{th} < 0$$

By doing so, the valleys of the target object may be accurately detected in a case where the current value I is extremely large.

Ultimately, it involves the following procedures, when a ridge of the target object comparable to a ridge of a fingerprint comes in contact with the electrostatic capacitance detecting device, the signal amplifying element hardly conducts a current, while, at the same time, when a valley of the target object comparable to a valley of a finger print approaches the electrostatic capacitance detecting device, the signal amplifying element conducts a large current and recognizes the ridges and valleys of the target object correctly. Therefore, to assure correct recognition, it is necessary for the capacitance detecting dielectric layer in the electrostatic capacitance detecting element to be positioned on the uppermost surface of the electrostatic capacitance detection device.

Further, the area $S_T$ (μm²) of the gate electrode and the thickness $t_{ox}$ (μm) of the gate insulator of the MIS thin-film semiconductor device for signal amplification, the dielectric constant $\in_{ox}$ of the gate insulator, the area $S_R$ (μm²) of the reference capacitor electrode, the thickness $t_R$ (μm) of the capacitance detecting dielectric layer, and the dielectric constant $\in_D$ of the capacitance detecting dielectric layer and the like must all be set to make the element capacitance $C_D$ sufficiently larger than $C_R+C_T$ which is the sum of the reference capacitor capacitance $C_R$ and the transistor capacitance $C_T$. Furthermore, it is necessary for the electrostatic capacitance detection device to be configured such that the reference capacitor capacitance $C_R$ is sufficiently larger than the target object capacitance $C_A$, when the target object is not in contact with the capacitance detecting dielectric layer but is separated by the target object distance $t_A$. Moreover, it is ideal for the reference capacitor capacitance $C_R$ to be sufficiently larger than the target object capacitance $C_A$. To be more specific, the electrostatic capacitance detection device is characterized such that the reference capacitor capacitance $C_R$ and the transistor capacitance $C_T$ meet the following equation:

$$C_R > 10 \times C_T$$

then, the element capacitance $C_D$, the transistor capacitance $C_T$, and the target object capacitance $C_A$ meet the following relationship:

$$C_D > 10 \times C_R$$

$$C_R > 10 \times C_A$$

In addition, if a positive power supply is used for the power-supply voltage $V_{dd}$, an n-type enhancement mode transistor (normally off type) is preferably used as the MIS thin-film semiconductor device for signal amplification. The minimum gate voltage $V_{min}$ of this n-type transistor meets the relationship:

$$0 < 0.1 \times V_{dd} < V_{min} \text{ or } 0 < V_{GT} < V_{min}$$

In addition, it is ideal to use an n-type enhancement mode transistor whose threshold voltage $V_{th}$ is less than $V_{GV}$ and which specifically meets the relationship:

$$0 < V_{th} < 0.91 \times V_{dd} \text{ or } 0 < V_{th} < V_{GV}$$

Conversely, if a negative power supply is used for the power supply voltage $V_{dd}$, a p-type enhancement mode transistor (normally off type) is preferably used as the MIS thin-film semiconductor device for signal amplification. It is ideal to use a p-type enhancement mode transistor. The minimum gate voltage $V_{min}$ of this p-type transistor meets the relationship;

$$V_{min} < 0.1 \times V_{dd} < 0 \quad V_{min} < V_{GT} < 0$$

In addition, it is ideal to use a p-type enhancement mode transistor whose threshold voltage $V_{th}$ is larger than $V_{GV}$ and which specifically meets the relationship $$0.91 \times V_{dd} < V_{th} < 0 \text{ or } V_{GV} < V_{th} < 0$$

Figure 6:
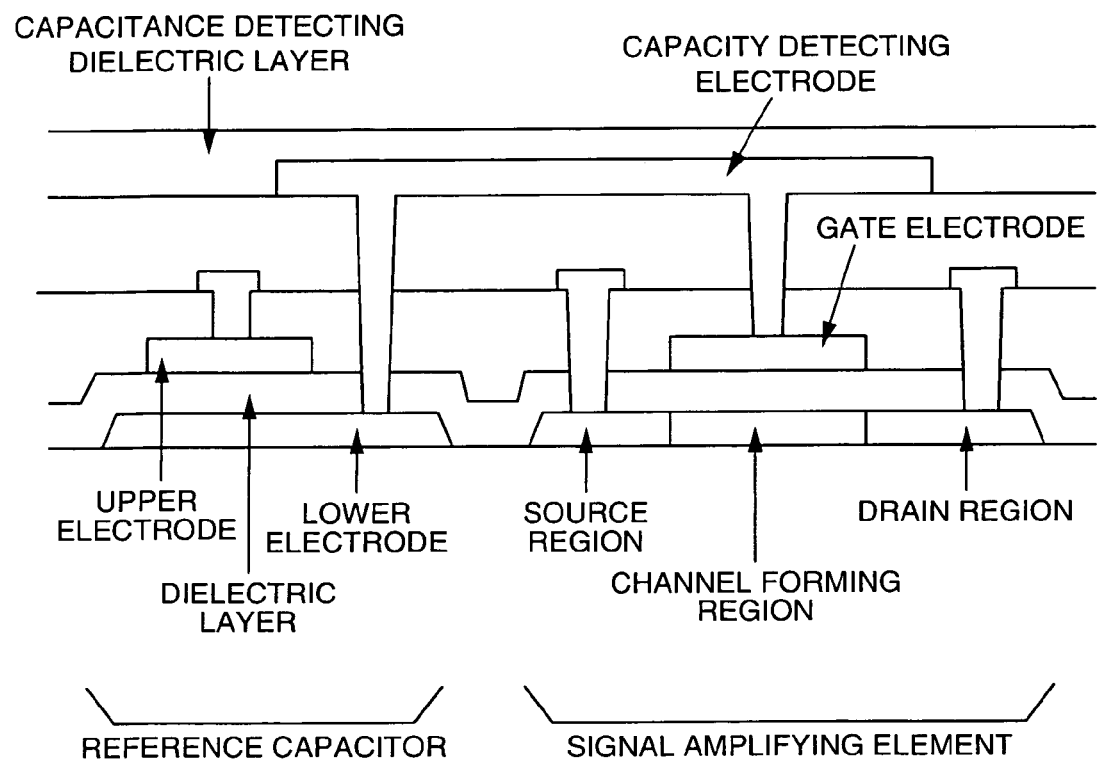
FIG. 6 is a diagram illustrating configuration of an element of the invention.

Next, a structure of an electrostatic capacitance detection device embodying such invention will be described with reference to FIG. 6. In this invention, a row selecting element, a column selecting element, and a signal amplifying element take the same structure except for the conductive type of a source and drain region and the concentration of impurities. FIG. 6 shows a sectional structure of a signal amplifying element and a reference capacitor. An MIS thin-film semiconductor device for signal amplification constituting the signal amplifying element within the electrostatic capacitance detecting element includes, as its indispensable constituent feature, a semiconductor layer having a source region, a channel forming region, and a drain region as well as a gate insulator and a gate electrode. An MIS thin-film semiconductor device for row selection constituting the row selecting element as well as an MIS thin-film semiconductor device for column selection constituting the column selecting element includes, as its indispensable constituent feature, a semiconductor layer having a source region, a channel forming region, and a drain region as well as a gate insulator and a gate electrode.

According to a configuration example of FIG. 6, the MIS thin-film semiconductor device for signal amplification constituting a row selecting element is fabricated by an NMOS, and a reference capacitor lower electrode is constituted by a n-type semiconductor layer which is of the same material as the drain region of the MIS thin-film semiconductor device for signal amplification. A reference capacitor lower electrode and the drain region of the thin-film semiconductor device, too, are formed on the same protective base layer. A dielectric layer of the reference capacitor consists of a silicon oxide layer which is the same material as the gate insulator of the MIS thin-film semiconductor device for signal amplification, being formed jointly on the same layer (on the semiconductor layer). A reference capacitor upper electrode is formed of a metallic layer (specifically, a tantalum thin film), which is the same material as the gate electrode of the MIS thin-film semiconductor device for signal amplification, and formed on a silicon oxide layer making up a gate insulator and a reference capacitor dielectric layer. In FIG. 6, although the reference capacitor lower electrode is connected to the capacitance detecting electrode and the gate electrode of the signal amplifying element, the reference capacitor upper electrode may be connected to the capacitance detecting electrode and the gate electrode of the signal amplifying element.

Such an electrostatic capacitance detecting element may be formed on a plastic substrate using the aforementioned SUFTLA technology. On plastics, a fingerprint sensor based on single-crystal silicon technology tends to break down easily or provides an insufficient size to make it useful in practical application. In contrast, an electrostatic capacitance detecting element formed on a plastic substrate according to the present invention will not break even if the area on the plastic substrate is sufficiently large to cover a fingertip. Hence, the invention may be used as a fingerprint sensor on a plastic substrate. Specifically, the present invention makes it possible to realize a smart card equipped with a personal identification function. For use in cash dispensing cards (bank cards), credit cards, ID cards and the like, smart cards equipped with a personal identification function have an outstanding feature not only to improve the security level of these cards but also to protect personal fingerprint information from being disclosed to outside the card.

An electrostatic capacitance detection device made up of thin-film semiconductor devices was fabricated on a glass substrate, and then imprinted on a plastic substrate using the SUFTLA technology, thereby producing the electrostatic capacitance detection device on the plastic substrate. The electrostatic capacitance detection device is made up of electrostatic capacitance detecting elements aligned in a matrix of 304 rows and 304 columns. The matrix size is a 20 mm square. The substrate is poly-ether-sulfone (PES), 400 μm thick. The MIS thin-film semiconductor device for signal amplification, the MIS thin-film semiconductor device for column selection, and the thin-film semiconductor device for row selection, are all fabricated with thin-film transistors having the same cross-sectional structure.

The thin-film transistors are a top-gate type, as shown in FIG. 4, to be fabricated in a low-temperature process subject to the maximum process temperature of 425° C. The semiconductor layer is a polycrystalline silicon thin-film obtained through laser crystallization, with a thickness of 50 nm. In addition, the gate insulator is a silicon-oxide layer, 45 nm thick, being formed by chemical vapor deposition (CVD), and the gate electrode consists of a 400-nm-thick tantalum thin-film. The dielectric constant of the silicon oxide film that forms the gate insulator was obtained to be approximately 3.9 according to the CV measurement. The reference capacitor lower electrode is formed of the same n-type semiconductor layer as the drain region of the n-type MIS thin-film semiconductor device for signal amplification, the reference capacitor dielectric layer is made of the same silicon oxide film as the gate insulating layer of the n-type MIS thin-film semiconductor device for signal amplification, and the reference capacitor upper electrode consists of the same tantalum thin film as the gate electrode of the n-type MIS thin-film semiconductor device for signal amplification. The reference capacitor lower electrode is connected to the column line through a contact hole, and the upper electrode is connected to the gate electrode and the capacitance detecting electrode of the n-type MIS thin-film semiconductor device for signal amplification.

Circuit configuration of the electrostatic capacitance detecting element is the same as FIG. 3. To a power-supply line wired in the electrostatic capacitance detecting element, there is connected a negative power supply (ground potential), and a positive power supply ($V_{dd}$=+3.3V) is connected to beyond the output line. The instrument is a comparator made up of a thin-film semiconductor device. The column line and the row line are maintained at the ground potential at the time of non-selection, and a positive power-supply potential ($V_{dd}$=+3.3V) is provided at the time of selection.

In this example, a pitch of the matrix forming the electrostatic capacitance detecting element was set at 66 μm, its resolution being 385 dpi (dots per inch). As a result, the area of the electrostatic capacitance detecting element became 1485 μm². The capacitance detecting dielectric layer was formed of silicon nitride film, 300 nm thick. Since the CV measurement gave approximately 7.5 for the dielectric constant of this silicon nitride film, the element capacitance $C_D$ became about 329 fF (femtofarad). If an electrostatic capacitance detecting device of this example is assumed, the ridges and valleys of a fingerprint are approximately 50 μm, hence, the target object capacitance $C_A$ was calculated to be 0.26 fF. On the other hand, the gate electrode length L of an MIS thin-film semiconductor device for signal amplification was set at 2 μm and the gate electrode width W was set at 2 μm, so that the transistor capacitance $C_T$ became approximately 3.07 fF. Also, the reference capacitor electrode area $S_R$ was set at 42 μm². As a result, the reference capacitor capacitance $C_R$ became 32 fF. Accordingly, the electrostatic capacitance detecting element meets the relationships:

$C_D > 10 \times C_R$ $C_R > 10 \times C_T$ $C_R > 10 \times C_A$

Thus, if the power supply voltage $V_{dd}$ is 3.3V, then 0.30V is the voltage $V_{GT}$ impressed on the gate electrode of the MIS thin-film semiconductor device for signal amplification when s ridge of a fingerprint touches the surface of the electrostatic capacitance detection device; and 3.08V is the voltage $V_{GV}$ impressed on this gate electrode when a valley of a fingerprint arrives.

The minimum gate voltage $V_{min}$ of the n-type MIS thin-film semiconductor device for signal amplification used in this example was 0.35V larger than 0.30V which is the voltage $V_{GT}$ when the ridge of a fingerprint came in contact. Therefore, the n-type MIS thin-film semiconductor device for signal amplification entered the OFF state completely. On the other hand, since the threshold voltage $V_{th}$ was 1.42 V less than 3.11 V of the gate electrode voltage when the valley of a fingerprint showed up, the n-type MIS thin-film semiconductor device for signal amplification entered the ON state completely. As a result, a current value outputted from a signal amplifying element when the ridge of a fingerprint touched the surface of the electrostatic capacitance detection device was $4.5 \times 10^{-13}$ A, an exceedingly small value. Conversely, when the valley of a fingerprint showed up, a large current of $2.5 \times 10^{-5}$ A was outputted from the signal amplifying element. Hence, ridge and valley information on the fingerprint and the like was detected in good precision.

As described above in detail, the invention makes it possible to fabricate an electrostatic capacitance detection device by using thin-film semiconductor devices. While the related technology using a single crystal silicon wafer was able to form a small electrostatic capacitance detecting device of the order of a few mm×a few mm on a plastic substrate, the invention enables an electrostatic capacitance detecting device having an area some 100 times large than that to be formed on a plastic substrate. Further, ridge and valley information on a target object may be detected in extremely high accuracy. As a result, for example, an effect of substantially improving the security level of a smart card is attained. Still further, a related electrostatic capacitance detection device formed on a single-crystal silicon wafer utilizes a very minor part of the device area for the single-crystal silicon wafer, thus wasting a tremendous amount of energy and labor, whereas the invention has an additional effect of eliminating such waste in contribution to global environmental protection.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. An electrostatic capacitance detection device that reads surface contours of a target object through detection of electrostatic capacitance which changes according to a distance from the target object, comprising:

output lines and power-supply lines;

M number of row lines and N number of column lines arranged in a matrix of M rows and N columns; and an electrostatic capacitance detecting element formed at an intersection of a row line and a column line, the electrostatic capacitance detecting element including a signal detection element, a signal amplifying element, a column selecting element, and a row selecting element, the signal detection element having a capacity detecting electrode, a capacity detecting dielectric layer, and a reference capacitor, the reference capacitor being constituted by a reference capacitor first electrode, a reference capacitor dielectric layer, and a reference capacitor second electrode, the signal amplifying element, the column selecting element, and the row selecting element being coupled in series and arranged between the output line and the power-supply line, and the reference capacitor first electrode and the column line being electrically coupled.

2. The electrostatic capacitance detection device according to claim 1, further comprising:

the capacitance detection electrode and the reference capacitor second electrode being electrically coupled.

3. The electrostatic capacitance detection device according to claim 1, further comprising:

the signal amplifying element having an MIS thin-film semiconductor device for signal amplification which includes a gate electrode, a gate insulator, and a semiconductor layer, the gate electrode of the signal amplifying element being electrically coupled to the capacity detecting electrode and the reference capacitor second electrode.

4. The electrostatic capacitance detection device according to claim 1, further comprising:

the column selecting element having an MIS thin-film semiconductor device for column selection which includes a gate electrode, a gate insulator, and a semiconductor layer, the gate electrode of the column selecting element being electrically coupled to the column line.

5. The electrostatic capacitance detection device according to claim 1, further comprising:

the row selecting element having an MIS thin-film semiconductor device for row selection which includes a gate electrode, a gate insulator, and a semiconductor layer, the gate electrode of the row selecting element being electrically connected to the row line.

6. The electrostatic capacitance detection device according to claim 1, further comprising:

the signal amplifying element and the column selecting element being the thin-film conductor device of a same conductive type.

7. The electrostatic capacitance detection device according to claim 6, further comprising:

the column selecting element being an n-type thin-film semiconductor device, the column line being maintained at a negative power-supply potential at a time of non-selection and at a positive potential at a time of selection.

8. The electrostatic capacitance detection device according to claim 7, further comprising:

the row selecting element being an n-type thin-film semiconductor device, the row line being maintained at a negative potential at the time of non-selection and at a positive potential at the time of selection.

9. The electrostatic capacitance detection device according to claim 6, further comprising:

the column selecting element being a p-type thin-film semiconductor device, the column line being maintained at a positive potential at a time of non-selection and at a negative potential at a time of selection.

10. The electrostatic capacitance detection device according to claim 9, further comprising:

the row selecting element being a p-type thin-film semiconductor device, the row line being maintained at a positive potential at the time of non-selection and at a negative potential at the time of selection.

11. The electrostatic capacitance detection device according to claim 1, further comprising:

the power-supply line being coupled to a negative power supply.

12. The electrostatic capacitance detection device according to claim 11, further comprising:

the output line being coupled to a positive power supply through an instrument.

13. The electrostatic capacitance detection device according to claim 1, further comprising:

the power-supply line being coupled to a positive power supply.

14. The electrostatic capacitance detection device according to claim 13, further comprising:

the power-supply line being coupled to a negative power supply through an instrument.

15. The electrostatic capacitance detection device according to claim 1, further comprising:

the dielectric layer of the reference capacitor and the gate insulator of the MIS thin-film semiconductor device for signal amplification being formed of a same material on a same layer.

16. The electrostatic capacitance detection device according to claim 1, further comprising:

the first electrode of the reference capacitor and a drain region of the MIS thin-film semiconductor device for signal amplification being formed of a same material on a same layer.

17. The electrostatic capacitance detection device according to claim 1, further comprising:

the reference capacitor second electrode and a gate electrode of the MIS thin-film semiconductor device for signal amplification being formed of a same material on a same layer.

18. The electrostatic capacitance detection device according to claim 1, further comprising:

an element capacitance $C_D$ that is sufficiently larger than $C_R + C_T$ which is a sum of a reference capacitor capacitance $C_R$ and a transistor capacitance $C_T$, if the reference capacitor capacitance $C_R$ and the transistor capacitance $C_T$ of the MIS thin-film semiconductor device for signal amplification are defined by the equations ($\epsilon_{0o}$ is the permitivity in vacuum)

$$C_R = \epsilon_{0o} \cdot \epsilon_R \cdot S_R / t_R$$

$$C_T = \epsilon_{0o} \cdot \epsilon_{ox} \cdot S_T / t_{ox}$$

where $S_R$ (μm$^2$) is an area of the reference capacitor electrode, $t_R$ (μm) is a thickness of the reference capacitor dielectric layer, $\epsilon_R$ is a dielectric constant of the reference capacitor detecting dielectric layer, $S_T$ (μm$^2$) is a gate electrode area of the MIS thin-film semiconductor device for signal amplification, $t_{ox}$ is a thickness of a gate insulator, and $\epsilon_{ox}$ is a dielectric constant of the capacitance detecting dielectric layer; and if the element capacitance $C_D$ of the signal detection element is defined by the equation ($\epsilon_{0o}$ is the permitivity in vacuum)

$$C_D = \epsilon_{0o} \cdot \epsilon_D \cdot S_D / t_D$$

where the area of the capacitance detecting electrode is $S_D$ (μm$^2$), $t_D$ is a thickness of the capacitance detecting dielectric layer, and $\epsilon_D$ is a dielectric constant of the capacitance detecting dielectric layer.

19. The electrostatic capacitance detection device according to claim 18, further comprising:

the capacitance detecting dielectric layer being located on an uppermost surface of the electrostatic capacitance detection device.

20. The electrostatic capacitance detection device according to claim 18, further comprising:

the reference capacitor capacitance $C_R$ being sufficiently larger than the target object capacitance $C_A$, if the target object is not in contact with and is separated from the capacitance detecting dielectric layer by a target object distance $t_A$, and a target object $C_A$ is defined by the equation $$C_A = \epsilon_{0o} \cdot \epsilon_A \cdot S_D / t_A$$

where $\epsilon_{0o}$ is a permitivity in vacuum, $\epsilon_A$ is a dielectric constant of air, and $S_D$ is the area of the capacitance detecting electrode.

21. The electrostatic capacitance detection device according to claim 1, further comprising:

an element capacitance $C_D$ being sufficiently larger than $C_R + C_T$ which is a sum of a reference capacitor capacitance $C_R$ and a transistor capacitance $C_T$, if the capacitance detecting dielectric layer is located on an uppermost surface of the electrostatic capacitance detection device;

if the reference capacitor capacitance $C_R$ and the transistor capacitance $C_T$ of the MIS thin-film semiconductor device for signal amplification are defined by the equations ($\epsilon_{0o}$ is the permitivity in vacuum)

$$C_R = \epsilon_{0o} \cdot \epsilon_R \cdot S_R / t_R$$

$$C_T = \epsilon_{0o} \cdot \epsilon_{ox} \cdot S_T / t_{ox}$$

where $S_R$ (μm²) is an area of the reference capacitor electrode, $t_R$ (μm) is a thickness of the reference capacitor dielectric layer, $\epsilon_R$ is a dielectric constant of the reference capacitor dielectric layer, $S_T$ (μm²) is a gate electrode area of the MIS thin-film semiconductor device for signal amplification, $t_{ox}$ is a thickness of the gate insulator, and $\epsilon_{ox}$ is a dielectric constant of the capacitance detecting dielectric layer; and if the element capacitance $C_D$ of the signal detection element is defined by the equation ($\epsilon_{0o}$ is the permitivity in vacuum)

$$C_D = \epsilon_{0o} \cdot \epsilon_D \cdot S_D / t_D$$

where an area of the capacitance detecting electrode is $S_D$ (μm²), $t_D$ is a thickness of the capacitance detecting dielectric layer, and $\epsilon_D$ is a dielectric constant of the capacitance detecting dielectric layer; and the reference capacitor capacitance $C_R$ being sufficiently larger than a target object capacitance $C_A$, if a target object is not in contact with and is separated from the capacitance detecting dielectric layer by a target object distance $t_A$, and the target object $C_A$ is defined by the equation $$C_A = \epsilon_{0o} \cdot \epsilon_A \cdot S_D / t_A$$

where $\epsilon_{0o}$ is the permitivity in vacuum, $\epsilon_A$ is a dielectric constant of air, and $S_D$ is an area of the capacitance detecting electrode.

* * * * *